United States Patent [19]

Stephany et al.

[11] Patent Number: 5,631,505
[45] Date of Patent: May 20, 1997

[54] MOVING COIL LINEAR ACTUATOR

[75] Inventors: Thomas M. Stephany, Churchville; William Mey, Rochester; Edward P. Furlani, Lancaster, all of N.Y.

[73] Assignee: Eastman Kodak Company, Rochester, N.Y.

[21] Appl. No.: 421,166

[22] Filed: Apr. 13, 1995

[51] Int. Cl.$^6$ ........................................... H02K 41/00
[52] U.S. Cl. .................... 310/12; 310/13; 310/190; 318/135; 335/222; 335/223; 335/224
[58] Field of Search .................... 310/12, 13, 14, 310/190, 191, 154; 318/135; 325/222, 223, 224

[56] References Cited

U.S. PATENT DOCUMENTS

| | | | |
|---|---|---|---|
| 3,505,544 | 4/1970 | Helms | 310/12 |
| 3,659,124 | 4/1972 | Lathrop | 310/13 |
| 3,743,870 | 7/1973 | Hunt | 310/13 |
| 3,899,699 | 8/1975 | Griffing | 310/13 |
| 3,984,706 | 10/1976 | Inouye | 310/12 |
| 4,247,794 | 1/1981 | Jooss et al. | 310/13 |
| 4,570,249 | 2/1986 | Malissin et al. | 369/45 |
| 4,992,684 | 2/1991 | Matsui | 310/12 |
| 5,016,238 | 5/1991 | Shtipelman et al. | 369/215 |
| 5,341,054 | 8/1994 | Tal et al. | 310/14 |
| 5,343,811 | 9/1994 | Schuster | 104/283 |
| 5,345,206 | 9/1994 | Morcos | 335/222 |

*Primary Examiner*—Thomas M. Dougherty
*Assistant Examiner*—Karl Imayoshi Eizo Tamai
*Attorney, Agent, or Firm*—Francis H. Boos, Jr.

[57] ABSTRACT

A moving coil linear actuator including an elongated permanent magnet having a cross-sectional width substantially greater than its edge height and having an elongated length of soft magnetic material disposed along one or both edges of the permanent magnet to enhance the magnetic field strength in the gap through which the moving coil translates.

3 Claims, 2 Drawing Sheets

5,631,505

MOVING COIL LINEAR ACTUATOR

FIELD OF THE INVENTION

This invention relates generally to the field of moving coil magnetic linear actuators.

BACKGROUND OF THE INVENTION

Moving coil linear actuators are well known for providing linear motion. Such actuators embody a core of soft magnetic material forming an elongated gap in which an elongated permanent magnet is disposed in contact with one of the legs of the core so as to leave a magnetic gap between the magnet and the other leg of the core. A coil of current conducting wire encircles the opposing leg of the core such that a segment of the coil side lies in the magnetic field of the magnetic gap. When a voltage is applied to the coil, the current in the coil interacts with the magnetic field and creates a force that drives the coil along the gap in a direction determined by the relative directions of the current through the coil and the north-south direction of the flux lines of the magnetic field.

For applications requiring high velocity drive along extended lengths of linear motion, it is desired to have a high magnetic field strength in the gap. This requires the use of a strong permanent magnet to create the necessary magnetic field and also a large sized, high permeability core material to support the flux created by the magnetic field without becoming saturated. Such structures become heavy and unwieldy. It is therefore desirable to provide a structure that enhances the field in the gap without adding unduly to the size and weight of the actuator or, alternatively, to reduce the size and weight of the actuator for a given gap field strength.

SUMMARY OF THE INVENTION

In accordance with the invention therefore, there is provided a moving coil linear actuator which comprises an elongated core of soft magnetic material having elongated legs defining a space therebetween and an elongated permanent magnet disposed in the space between the core legs to form a magnetic field gap between a pole face of the magnet and an opposing core leg, the magnet having a cross section in which the face width of the magnet in the magnetic gap is substantially greater than its edge height. The actuator also includes a moving coil encircling the other leg of the core with a coil side disposed in the magnetic gap. In accordance with a feature of the invention, the actuator further includes a strip of soft magnetic material disposed along a length of at least one non-pole edge of the permanent magnet whereby an additive magnetic field is created that increases the field strength over that created by the permanent magnet alone, the increased field strength occurring in a region of the magnetic gap coincident with the length of the strip.

DETAILED DESCRIPTION OF THE INVENTION

Figure 1:
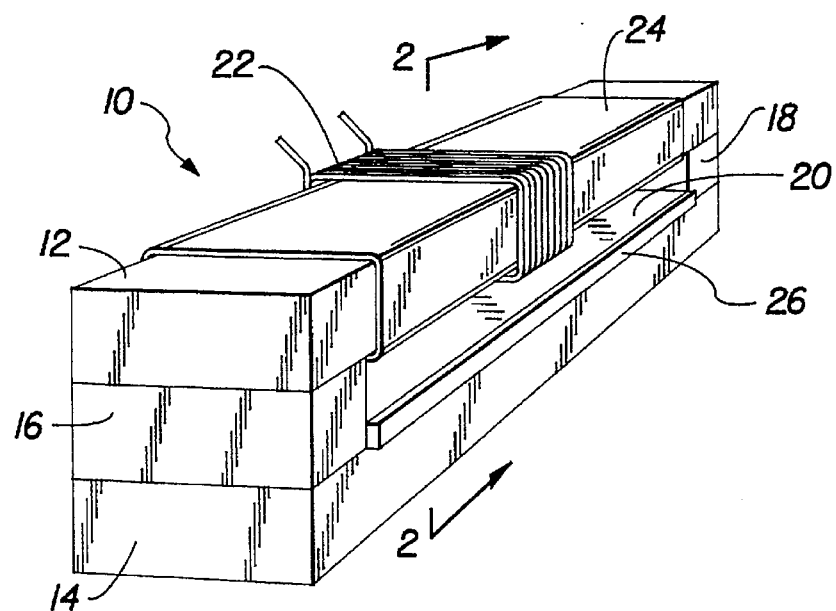
FIG. 1 is a perspective view of an optical disc read/write mechanism embodying a moving coil linear actuator constructed in accordance with the present invention.
Figure 2:
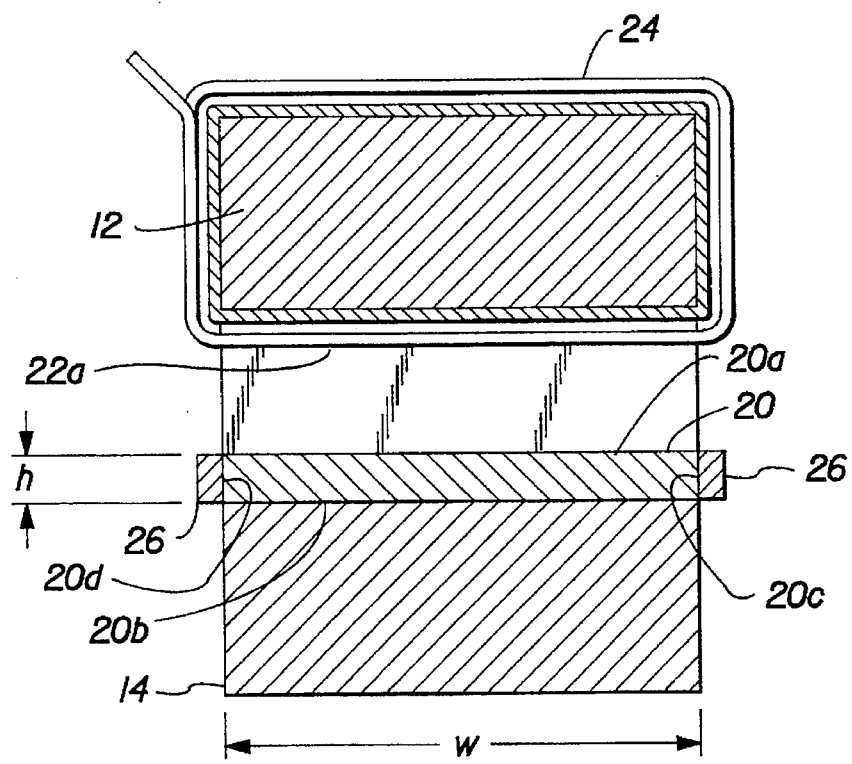
FIG. 2 is a cross section view of the actuator of FIG. 1.

Referring jointly to FIGS. 1 and 2, the moving coil linear actuator 10 shown therein comprises an elongated core of soft magnetic material having spaced apart, parallel, core legs defining a space between opposing faces of the core legs. The spacing is determined by core and pieces 16 and 18. The actuator also includes an elongated bi-polar permanent magnet positioned in the space between the opposing faces of the core legs. The magnet 20 has elongated top and bottom pole faces 20a, 20b and first and second elongated non-pole sides (edges) 20c, 20d. One pole face 20a of the magnet is spaced from the face of an opposing core leg 12 to form a magnetic field gap therebetween. The cross section of the magnet in a plane normal to its elongated dimension has a width "w" parallel to the face of the core leg that is substantially greater than the edge height "h" perpendicular to the face of the core leg 12.

The actuator 10 further includes a moving coil 22, encircling one of core legs such that a side 22a of the coil is disposed in the gap. The coil 22 is suspended by a carrier (not shown) as is well known in actuator design. A shorted turn 24 in the form of a copper sheet is wrapped around the core leg 12 between the core leg and the moving coil and operates in conventional manner to reduce the inductance of the moving coil thereby increasing the response time of the actuator.

In accordance with a feature of the invention, an elongated length of soft magnetic material in the form of a strip 26 is disposed along at least one edge and preferably along both edges of the permanent magnet 20. In an actually constructed embodiment, strips consist of cold rolled, annealed steel of 1/16" thickness. It will be appreciated that the drawings are not to scale and the thickness of the added strip or strips is exaggerated for ease of illustration. The effect of the added strip on the actuator is to create an additive magnetic field that increases the field strength in the magnetic field gap over a substantial portion of the width of the permanent magnet beyond the field strength that would be created by the permanent magnet alone. The increased field strength occurs over a length of the magnetic field gap that is substantially coincident with the length of soft magnetic material.

Figure 3:
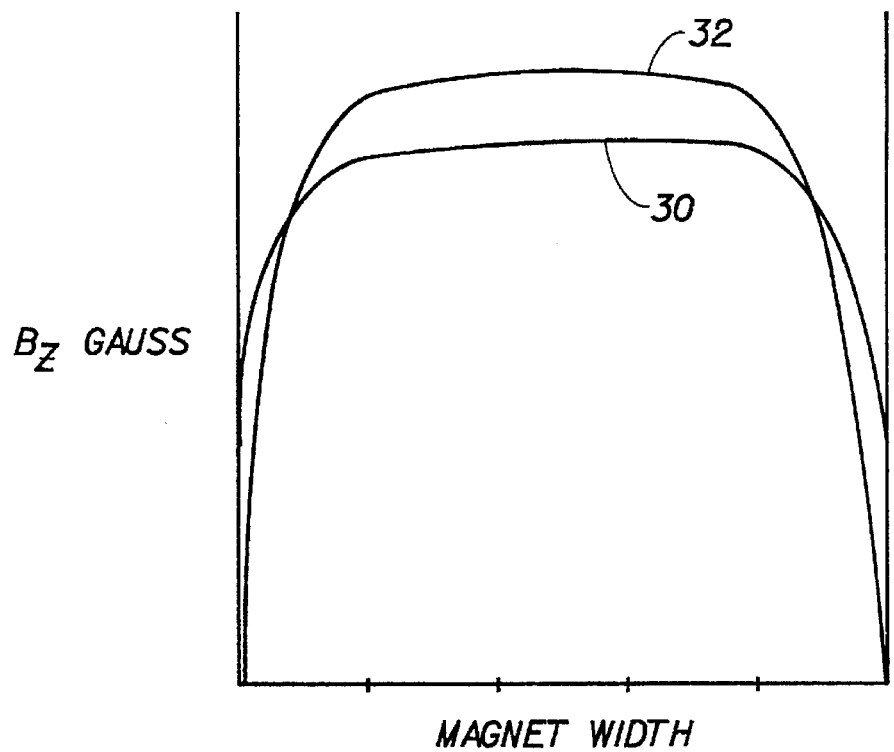
FIG. 3 a field strength diagram showing the increased field strength achieved in an actuator in accordance with the invention.
Figure 4:
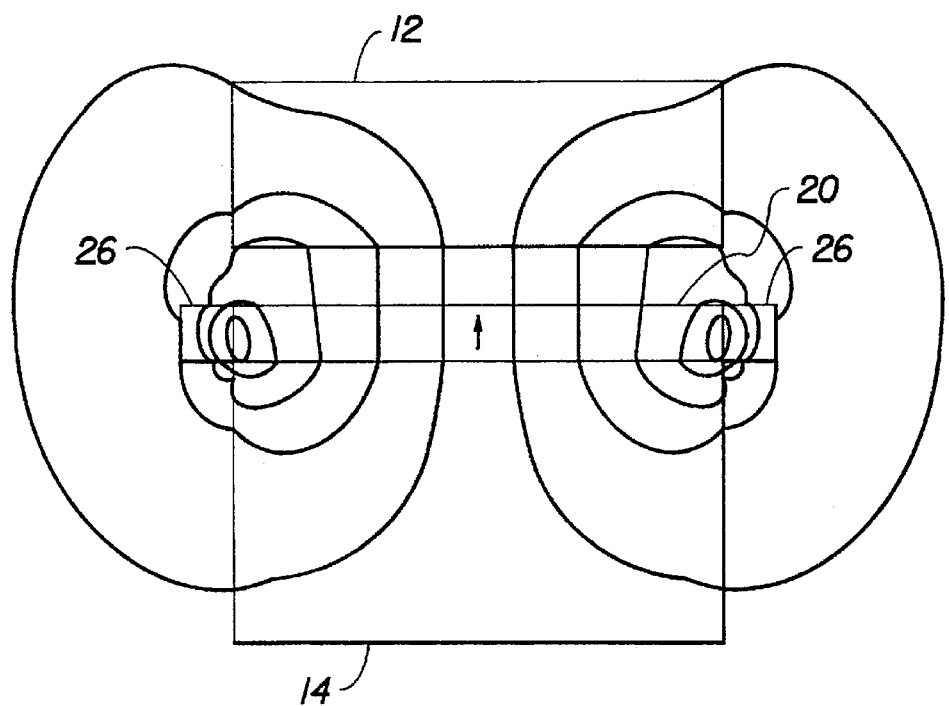
FIG. 4 is a magnetic flux diagram for the actuator of FIG. 1 showing the effect of the invention on the distribution of the actuator's lines of magnetic flux.

The effect of this added field strength can be seen with reference to FIG. 3 in which curve 30 shows the unenhanced field strength in the absence of the strips 26 and curve 32 shows the enhanced field strength with the strips added to the sides of the magnet. The pattern of the magnet flux lines with the strips added is shown in FIG. 4. The ratio of the cross-sectional width "w" of the magnet to its height "h" will have an effect on the degree to which the added strips 26 will enhance the vertical magnetic field strength in the gap. For magnets that are approximately as wide as they are high, the effect is to decrease the magnitude of the field over most of the area immediately above the magnet. The reason for this is that the strips become polarized when placed near the magnet and once polarized, give rise to an additional magnetic field that is superimposed with that of the magnet itself. The resultant vertical field is weakened above the magnet because the strips provide a high permeability path for the magnetic flux that emanates from the top of the magnet and, being relatively close to field in the center of the magnet, tend to bend the flux, that would otherwise be vertical, towards the sides of the magnet (in symmetrical fashion). Since the vertical field component is proportional to the vertical flux density, and since this density is reduced immediately above the magnet, the field is reduced. Conversely, for magnets that are much wider than they are high, the added field strength created by the presence of the strips enhances the vertical component of the field over a substantial central portion of the width of the magnet. Because of the relatively longer distance to the strips 26, this portion is not as affected by the low permeability return path of the strips. Some reduction of the vertical field component does occur near the edges of the magnet but the net effect is an enhancement of the overall field strength that is operative on the moving coil, as seen in FIG. 4. Thus the placement of soft magnetic strips on the sides (edges) of the permanent magnet will enhance or reduce the vertical field component in the operative gap depending on its aspect ratio R=width/height. If the width is much greater than the height, e.g. R=10, the field will be enhanced thereby improving the performance of the actuator. If the width is of the same order of magnitude as the height, e.g. R=1, the field will be reduced.

The invention has been described with reference to a preferred embodiment. However, it will be appreciated that variations and modifications can be effected by a person of ordinary skill in the art without departing from the scope of the invention.

PARTS LIST 10 moving coil linear actuator
12 core leg
14 core leg
16 core end piece
18 core end piece
20 permanent magnet
22 moving coil
24 shorted turn
26 soft magnetic material strip
30 field strength-unenhanced
32 field strength-enhanced

What is claimed is:

1. A moving coil linear actuator comprising:

a pair elongated core legs having spaced apart, parallel, opposing faces;

an elongated permanent magnet positioned in the space between the opposing core leg faces, the magnet having elongated top and bottom pole faces and first and second elongated non-pole edges, at least one pole face of the magnet being spaced from an opposing core leg face to form a magnetic field air gap therebetween, the cross section of the magnet in a plane normal to its elongated dimension having a width parallel to the face of the core leg which is substantially greater than the edge height perpendicular to the face of the core leg;

a moving coil encircling one of said core legs such that a side of said coil is disposed in the gap; and an elongated length of soft magnetic material disposed along at least one of said non-pole edges of the permanent magnet whereby an additive magnetic field is created by the elongated length of magnetic material that increases the field strength in the magnetic field gap over that created by the permanent magnet alone, the increased field strength occurring in a region of the magnetic field gap coincident with the length of soft magnetic material.

2. The actuator of claim 1 having an elongated length of soft magnetic material disposed along both of said non-pole edges of the permanent magnet.

3. The actuator of claim 1 wherein the elongated length of soft magnetic material is cold rolled steel.

* * * * *